UNITED STATES PATENT OFFICE.

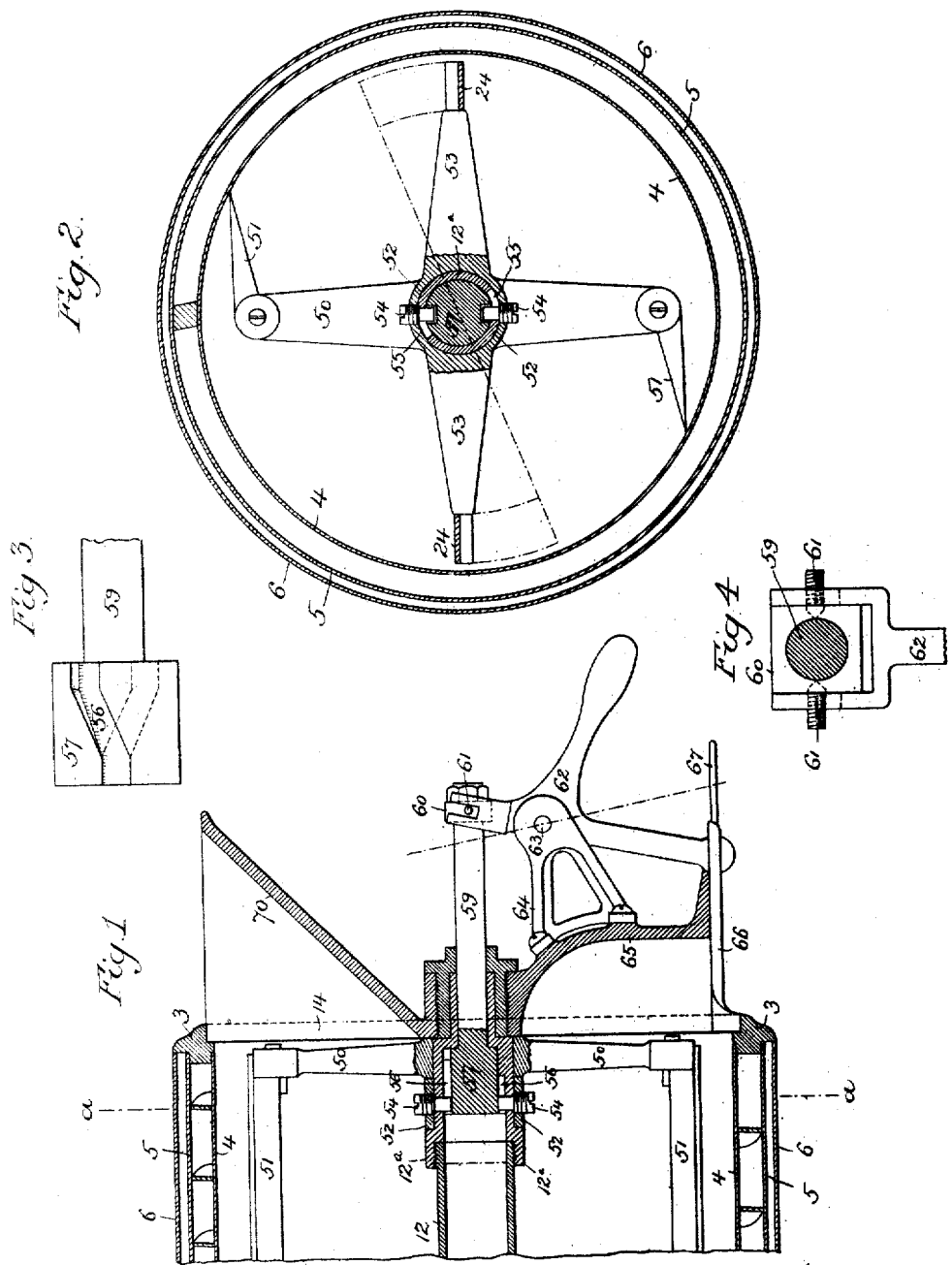

FRANK TYSON, OF CANTON, OHIO.

ICE-CREAM FREEZER.

No. 903,030.

Specification of Letters Patent.

Patented Nov. 3, 1908.

Application filed June 13, 1907. Serial No. 378,806.

*To all whom it may concern:*

Be it known that I, FRANK TYSON, a citizen of the United States, residing in Canton, Ohio, have invented certain Improvements in Ice-Cream Freezers, of which the following is a specification.

My invention consists of certain improvements in the ice cream freezer forming the subject of my Letters Patent No. 855,364, dated May 28, 1907, one of the objects of my present invention being to permit ready inspection of the contents of the freezing vessel at all stages of the freezing operation, another object being to insure the delivery of the frozen contents of said freezing vessel into a can or other receptacle without loss or inconvenience, and a still further object being to so connect that element of the machine which effects the discharge of the frozen cream with the valve which governs the outlet that such element will be operative to discharge the frozen cream only when said valve is open. These objects I attain in the manner hereinafter set forth, reference being had to the accompanying drawing, in which Figure 1 is a vertical longitudinal section of one end of a rotary horizontal ice cream freezer, illustrating my present invention;
Fig. 2 is a transverse section of the same, on the line *a—a*, Fig. 1, and Figs. 3 and 4 are detached views, on a larger scale, of certain elements of the mechanism forming the subject of my present invention.

Referring in the first instance to Fig. 1 of the drawing, 3 represents one of the end frames of the freezing vessel, to which is connected one end of each of the three metal cylinders 4, 5 and 6 constituting the casing of the said freezing vessel, 12 representing the central shaft of the freezer, which has a head 12ª, the outer portion of the latter turning in a bearing carried by the central portion of a head 14, which is secured to the end frame 3, preferably in such manner that it can be readily detached therefrom.

Secured to the shaft head 12ª is a hub provided with arms 50, whose outer ends carry pivot pins for a pair of scraper blades 51 of any desired character, and also mounted upon and rotating with the shaft head 12ª is a hub 52, provided with projecting arms 53, which carry blades 24, similar in function to those of the machine of the former patent, the opposite ends of these blades being, as in the former machine, intended to be mounted upon a structure which rotates with the shaft 12. The hub 52 is, however, capable of a certain degree of rotary movement on the shaft head 12ª, so that; when in one of its extreme positions, the blades 24 will be parallel with the axis of the shaft 12, as shown by full lines in Fig. 2, and will therefore act only as beaters upon the mass of cream contained in the freezing vessel, while, when the hub is adjusted to its other extreme position, one end of each blade will be adjusted forwardly or backwardly in respect to its other end, (see dotted lines, Fig. 2) to such an extent as to cause said blade to occupy a spiral position in the cylinder and therefore act as an ejector for the frozen cream. This adjustment of the hub 52 is effected in the following manner. Secured to said hub are a pair of set screws 54, whose inner ends pass through segmental slots 55 in the shaft head 12ª and engage with cam slots 56 formed in the periphery of a plug 57, which is free to slide longitudinally in the hollow shaft 12 and its hollow head 12ª, and is connected to a shaft 59, axially disposed in respect to the shaft head and passing through the same and its bearing, the outer end of said shaft 59 having mounted upon it a block 60 provided with oppositely projecting pins 61 which engage the forked and slotted arm of a lever 62, the fulcrum pin 63 of this lever being adapted to bearings in a bracket 64, and the latter being secured to the curved outlet nozzle 65 with which the lower portion of the head 14 is provided, as shown in Fig. 1. This outlet nozzle is provided with a sliding valve 66, and with the latter engages a third arm of the lever 62, preferably by means of a ball-and-socket joint, whereby, on operating said lever 62 movement will be imparted simultaneously to said valve 66 and to the plug 57 of the shaft 59. The cam slots 56 of said plug 57 are so disposed that when the valve 66 is closed and the plug 57 is retracted to its full extent, as shown in Fig. 1, the hub 52 will occupy that extreme of its movement which provides for the adjustment of the blades 24 in line with the axis of the shaft 12, but when the lever is moved so as to open the valve 66 the plug 57 will be projected to the position shown by dotted lines in Fig. 1, which movement will effect a partial turning of the hub 52 and the adjustment of the blades 24 to their spiral or ejecting position indicated by dotted lines in Fig. 2, with the result that said blades 24 will act as ejectors only when the valve 66 is open, closing of the valve restoring the blades to their normal position in which they act simply as beaters.

The valve 66 is provided with a projecting grip 67 whereby it may be directly operated, in which case the lever 62 may have but two arms, one engaging with the valve and the other with the block 60 at the outer end of the shaft 59.

The upper portion of the head 14 of the freezing vessel is provided with a hopper 70, through which the cream may be fed into the interior of the freezing vessel, this hopper being in direct communication with the said interior of the freezing vessel, so that the contents of the latter can be plainly seen through the hopper, and the condition of the cream at all stages of the freezing process can thus be under the direct observation of the attendant standing at the delivery end of the machine.

It being understood that the charge of cream fed to the freezing vessel is never likely to be in such volume as to occupy much more than one-half of the capacity of said vessel the agitation to which this mass of cream is subjected during the freezing operation is not sufficient to cause it to overflow the guarded or hoppered opening in the upper portion of the head 14, although it may fall into the hopper, consequently a valve for the latter is not necessary, although such valve may be provided if desired, the valve being opened when the condition of the contents of the freezing vessel is to be observed.

The discharge nozzle 65 delivers directly downward, and its mouth is less in area than that of the ordinary ice cream storage and service can, consequently, when the valve 66 is open, the discharge from the nozzle can pass at once into the mouth of the can placed below the nozzle and the delivery of the frozen cream from the freezing vessel can therefore be effected without splashing and consequently without loss or inconvenience.

I claim:—

1. A rotary ice cream freezer having a head provided in its lower portion with a valved discharge nozzle and in its upper portion with a guarded or hoppered opening in communication with the end of the freezing chamber, whereby the contents of the latter can be observed through the opening during the operation of the machine.

2. A rotary ice cream freezer having a head provided, in its lower portion, with a downwardly directed and valved discharge nozzle, whereby the delivery of the frozen cream from the freezing vessel can be effected without splashing or loss.

3. A rotary ice cream freezer having a head provided, in its upper portion, with a feed hopper in open communication with the end of the freezing chamber, and, in its lower portion, with a downwardly directed and valved discharge nozzle.

4. A rotary horizontal ice cream freezer having a blade therein adjustable so as to serve as an ejector, a valved discharge outlet, and a connection between said blade and the valve, whereby coöperating movements can be imparted to them.

5. A rotary horizontal ice cream freezer having a blade therein adjustable to serve as an ejector, a partially rotatable blade carrier, a valved outlet, and an external lever, having connection with the outlet valve and blade carrier, whereby both of the same can be operated by the lever.

6. A rotary horizontal ice cream freezer having therein a blade adjustable to spiral position to serve as an ejector, a hub carrying said blade, and a plug having a cam connection with said hub, whereby movement of partial rotation can be imparted to the latter by a longitudinal movement of the plug.

7. A rotary horizontal ice cream freezer having a blade adjustable to spiral position to serve as an ejector, a hub carrying said blade, a plug having a cam connection with said hub, a valve controlling the outlet from the freezer, and a lever connecting said valve and plug whereby movement of both of said parts can be effected by said lever.

8. A rotary horizontal ice cream freezer having a blade adjustable to spiral position so as to serve as an ejector, a hub carrying said blade, a shaft having a tubular portion upon which said hub is mounted, and a plug guided longitudinally in said tubular portion of the shaft and having a cam connection with the hub.

9. A rotary horizontal ice cream freezer having a blade adjustable to spiral position so as to serve as an ejector, a hub carrying said blade, a shaft having a tubular portion on which said hub is mounted, a plug guided longitudinally in said tubular portion of the shaft and having a cam connection with the hub, and a shaft connected to said cam plug and projecting beyond the end of the main shaft.

10. The combination, in a rotary horizontal ice cream freezer, of a blade adjustable to spiral position so as to serve as an ejector, a hub carrying said blade, a plug having a cam connection with said hub, a shaft projecting from said plug, a block on said shaft having projecting pins, and a forked and slotted lever for engaging said pins and serving to impart longitudinal movement to the cam plug.

11. The combination, in a rotary horizontal ice cream freezer, of a blade adjustable to spiral position so as to serve as an ejector, a hub carrying said blade, a shaft on which said hub is mounted so as to be susceptible of partial rotation, a longitudinally movable plug having cam connection with said hub and having a projecting shaft, a discharge nozzle having a sliding valve, and a lever having an operating arm and other arms engaging, respectively, the sliding valve and the shaft of the plug.

12. A rotary ice cream freezer having, at one end, a head provided in its lower portion with a valved discharge nozzle and in its upper portion with an opening communicating with the interior of the freezing chamber and having an external guard or hopper into which the contents of said freezing chamber can overflow.

In testimony whereof, I have signed my name to this specification, in the presence of two subscribing witnesses.

FRANK TYSON.

Witnesses:
　HAMILTON D. TURNER,
　KATE A. BEADLE.